United States Patent
Stafford et al.

(10) Patent No.: US 8,245,360 B2
(45) Date of Patent: Aug. 21, 2012

(54) ROPE GRIP SLIP-KNOT DEVICE

(75) Inventors: Arthur Stafford, Reading, MA (US); Michael David Tinstman, Revere, MA (US); Daniel Richard Armstrong, Marblehead, MA (US); William Paul Liteplo, Cambridge, MA (US); John Darin Fiegener, Marblehead, MA (US)

(73) Assignee: Stafford Manufacturing Corp., Wilmington, MA (US)

( * ) Notice: Subject to any disclaimer, the term of this patent is extended or adjusted under 35 U.S.C. 154(b) by 931 days.

(21) Appl. No.: 12/206,792

(22) Filed: Sep. 9, 2008

(65) Prior Publication Data

US 2010/0058561 A1 Mar. 11, 2010

(51) Int. Cl.
*F16G 11/00* (2006.01)

(52) U.S. Cl. .................. 24/136 R; 24/71 CT; 24/115 M; 24/131 C; 403/369

(58) Field of Classification Search .............. 24/71 CT, 24/115 M, 131 C, 136 R; 403/369
See application file for complete search history.

(56) References Cited

U.S. PATENT DOCUMENTS

| | | | | |
|---|---|---|---|---|
| 854,957 A * | 5/1907 | Miller | ............................ | 24/114.5 |
| 992,821 A * | 5/1911 | Stewart | ........................ | 174/135 |
| 1,808,075 A * | 6/1931 | Rothschild | .................. | 24/136 R |
| 1,945,438 A * | 1/1934 | Landahl | ...................... | 24/136 R |
| 2,017,887 A * | 10/1935 | Blackburn | ...................... | 403/27 |
| 2,060,864 A * | 11/1936 | Hedler | ......................... | 403/278 |
| 2,130,825 A * | 9/1938 | Bergan | .......................... | 403/396 |
| 4,066,368 A * | 1/1978 | Mastalski et al. | ............. | 403/211 |
| 4,177,542 A * | 12/1979 | Denney | ....................... | 24/115 R |
| 4,355,441 A | 10/1982 | Hall | | |
| 4,413,382 A | 11/1983 | Siegmann | | |
| 4,458,389 A * | 7/1984 | Guthmann | ................... | 24/122.6 |
| 4,508,409 A * | 4/1985 | Cherry et al. | ................ | 439/391 |
| 4,657,110 A | 4/1987 | Wolner | | |
| 5,012,559 A | 5/1991 | Flannery | | |
| 5,577,299 A | 11/1996 | Thompson | | |
| 6,626,610 B1* | 9/2003 | Seegmiller | ................ | 405/259.5 |
| 6,658,704 B2* | 12/2003 | Buscart | ....................... | 24/115 G |
| 6,732,833 B2 | 5/2004 | Rogelja | | |
| 7,043,801 B2* | 5/2006 | Toimil | ......................... | 24/136 R |
| 7,076,845 B2 | 7/2006 | Tylasks | | |
| 7,118,299 B2* | 10/2006 | Gregel et al. | ................. | 403/305 |

* cited by examiner

*Primary Examiner* — Robert J Sandy
*Assistant Examiner* — David Upchurch
(74) *Attorney, Agent, or Firm* — Sand & Sebolt

(57) ABSTRACT

The present invention is a slip-knot grip device which attaches to a rope. The invention consists of a male end cap into which an insert is placed and a female end cap into which an insert is placed with the two end caps being connected by a retaining collar. The inserts have a semi-circle channel on their interior side placed so when the left and right inserts are connected together they form a circle opening through which a rope is placed. The female end cap and the male end cap are turned in opposite directions. This makes the end edges of the combined inserts clasp the rope holding the device in place.

19 Claims, 14 Drawing Sheets

ROPE GRIP SLIP-KNOT DEVICE

CROSS-REFERENCES TO RELATED APPLICATIONS (IF ANY)

None

STATEMENT AS TO RIGHTS TO INVENTIONS MADE UNDER FEDERALLY-SPONSORED RESEARCH AND DEVELOPMENT (IF ANY)

None

BACKGROUND OF INVENTION

1. Field of the Invention

The present invention is directed to a rope grip device, more particular to one that is easy to use and attach to a rope to provide a method of providing an easily adjustable stop to limit the movement of rope as well as to locate and easily relocate associated items along a length of rope. As well as to provide a hand-grip to make rope tensioning easier, and to bundle two or more smaller ropes together.

2. Background

The use of ropes has been around for centuries. Sailors and sailing ships have used ropes to secure sails and cargo. There have been a number of types of knots that have been used with rope and methods to secure the rope and things to the rope.

There still exists a need for the quick and easy method of securing a grip to function as a slip knot to a rope.

3. Prior Art

U.S. Pat. No. 7,076,845 by Tylaska, et al. and issued on Jul. 18, 2006, is for a Mechanical knot apparatus. It discloses a mechanical knot apparatus for replacing the use of a conventional knot or fitting for fastening or securing a rope or cable to an object.

U.S. Pat. No. 6,732,833 by Rogelja and issued on May 11, 2004, is for a Descender with two-way locking lever. It discloses a descender comprising a base having a connection means, a pivotal member pivotally mounted on the base about a pivot axis, the pivotal member defining first and second spaced projections for engaging a rope, the base defining a stop member and a lever pivotable between first and second end positions, the lever and the pivotal member defining complementary cam surfaces to regulate the distance between the stop member and the second projection, a resistance force applied to the rope being at a minimum when the second projection is moved away from the stop member and the lever is located in a mid-position, and is at a maximum when the lever moves towards either end position wherein the rope is pressed between the second projection and a braking surface.

U.S. Pat. No. 5,577,299 by Thompson, et al. and issued on Nov. 26, 1996, is for a Quick-release mechanical knot apparatus. It discloses a quick-release mechanical knot device for use in securing objects together having a novel means for quickly and safely releasing the mechanical knot device from the body of a rope or tether regardless of the amount of tension or load strain acting on the rope.

U.S. Pat. No. 5,012,559 by Flannery and issued on May 7, 1991, is for a Rope tightener. It discloses a rope tightener that is supported by or is engageable with a rope, line cord, or the like before it is manually tensioned and thereafter manipulated to draw the rope taut. The rope is stressed by threading the rope through a rectangular shaped loop in the device and then rotating the device in a plane parallel to the rope to twist the rope around a central body portion of the rectangular shaped loop in the device.

U.S. Pat. No. 4,657,110 by Wolner and issued on Apr. 14, 1987, is for an Inertia rope grab. It discloses a safety device for removable fastening to a safety line a rope grab which contains both inertia and positive locking features. A roller is provided in angled guide tracks to provide an inertia locking effect while a pivot arm can bear against the roller to provide positive locking as well.

U.S. Pat. No. 4,413,382 by Siegmann and issued on Nov. 8, 1983, is for a Rope clamp. It discloses a rope clamp, in which the rope is guided through rope openings of several clamping members which can be pivoted parallel to one another, secures the rope automatically. To enable the holding force to be increased and the clamping effect to be accurately adjusted, the rope openings have a considerable length and the clamping members are inclined, in their open position which permits a free passage of the rope, against the rope pulling direction.

U.S. Pat. No. 4,355,441 by Hall and issued on Oct. 26, 1982, is for a Rope-lock. It discloses a rope lock intended for preventing a rope inserted therein from being moved in a certain direction there through by a pulling force in the rope. The lock is primarily intended for use as a sheet lock or a winch unloading lock on sailing boats. The lock has an abutment, an operating member arranged pivotable about a first pin in relation to the abutment and a locking member arranged pivotable about a second pin relative to the abutment. The locking member has a thrust portion which forces the rope towards the abutment with a thrusting force in the active position, but not in the inactive position. The locking member also has a contact portion for generating at least a portion of this thrust force. The lock is taken between active position and inactive position by pivoting the operating member. Said member has an operating position which is eccentric relative to the first pin, and which is adapted for providing a torque about the second pin, at least in the active position, such that the rope is held between the abutment and the thrust portion.

There is still room for improvement in the art.

SUMMARY OF THE INVENTION

The present invention is a slip knot grip device which attaches to a rope. The invention consists of two end caps, one top, Female and one bottom, Male into which an insert is placed with the two end caps being connected by a retaining collar. The inserts have a semi-circle channel on their interior side so when the inserts are placed in the end caps, Male and Female and connected together they form a circle opening through which a rope is held.

The Female end cap and the Male end cap are connected by the retaining collar. The connection allows the Female end cap and the Male end cap to be turned. The rope is placed in or through the circular openings of the connected inserts. To allow the device to be moved along the rope the circular opening of the combined inserts in the Female end cap aligns with the circular opening of the combined insert in the Male end cap. When the device is at the location desired, the Female end cap and the Male end cap are turned in opposite directions. This reduces the effective cross-section of the opening between the inserts, thus pinching the rope and holding the device in place.

BRIEF DESCRIPTION OF THE DRAWINGS

Without restricting the full scope of this invention, the preferred form of this invention is illustrated in the following drawings.

BRIEF DESCRIPTION OF THE PREFERRED EMBODIMENTS

There are a number of significant design features and improvements incorporated within the invention.

Figure 1:
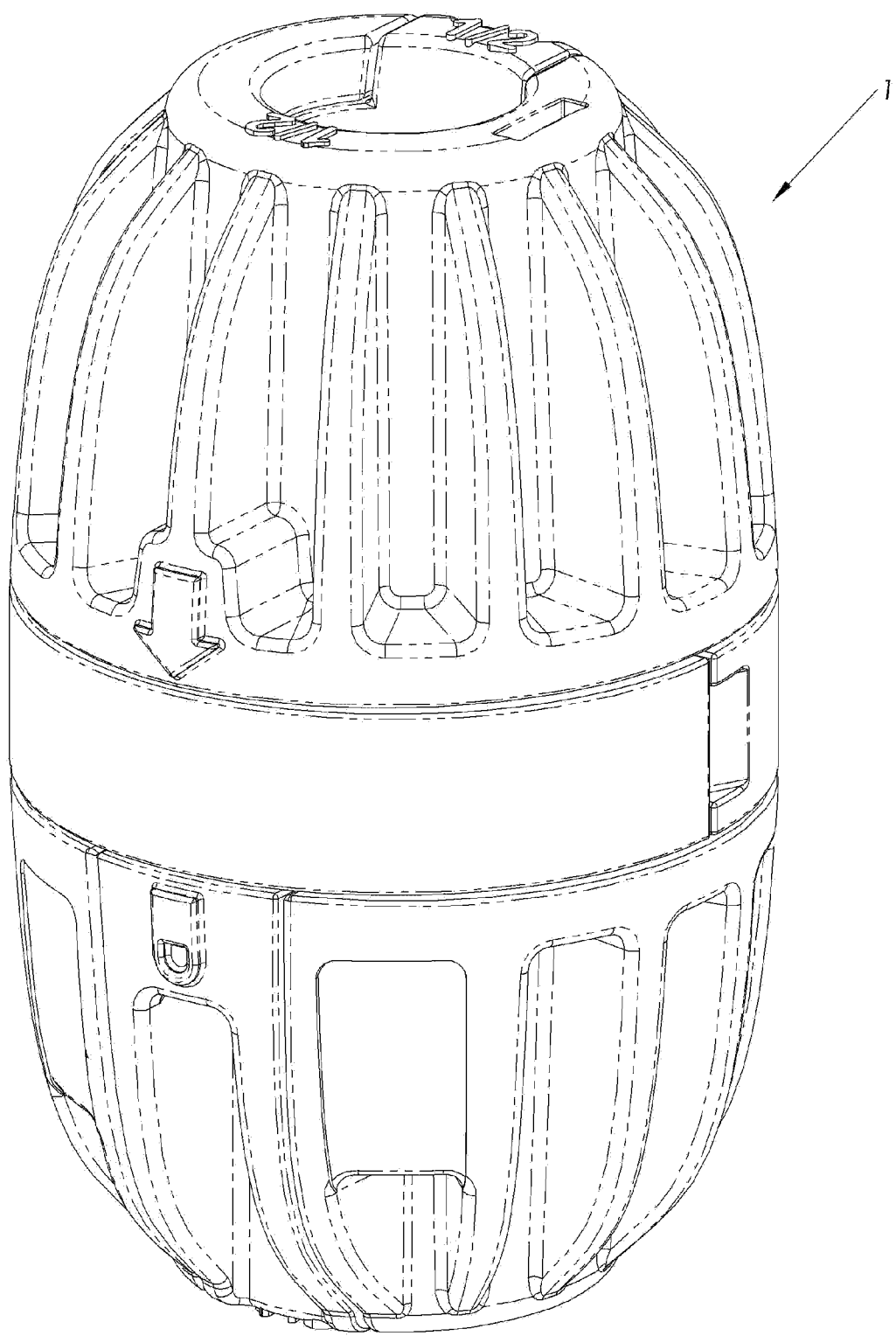
FIG. 1 displays the device.
Figure 3:
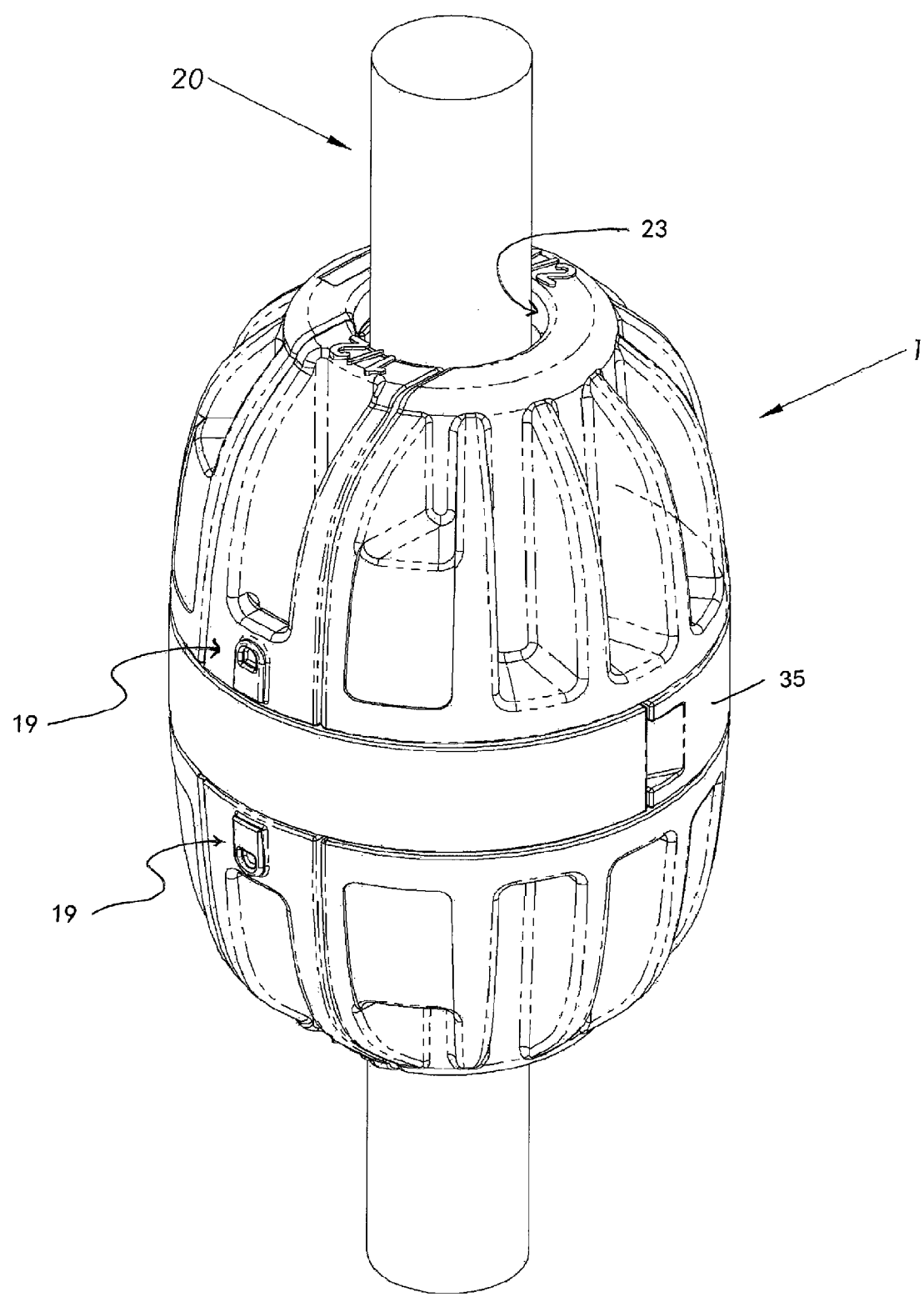
FIG. 3 displays the device being held in place on a rope.

As shown in FIGS. 1 and 3, the present invention is a slip-knot grip device 1 which attaches to and secures to a rope 20. Properly sized slip-knot grip device 1 can be used to grip 2, 3 or more ropes, lines or cables, to form loops, bundles, etc.

Figure 2:
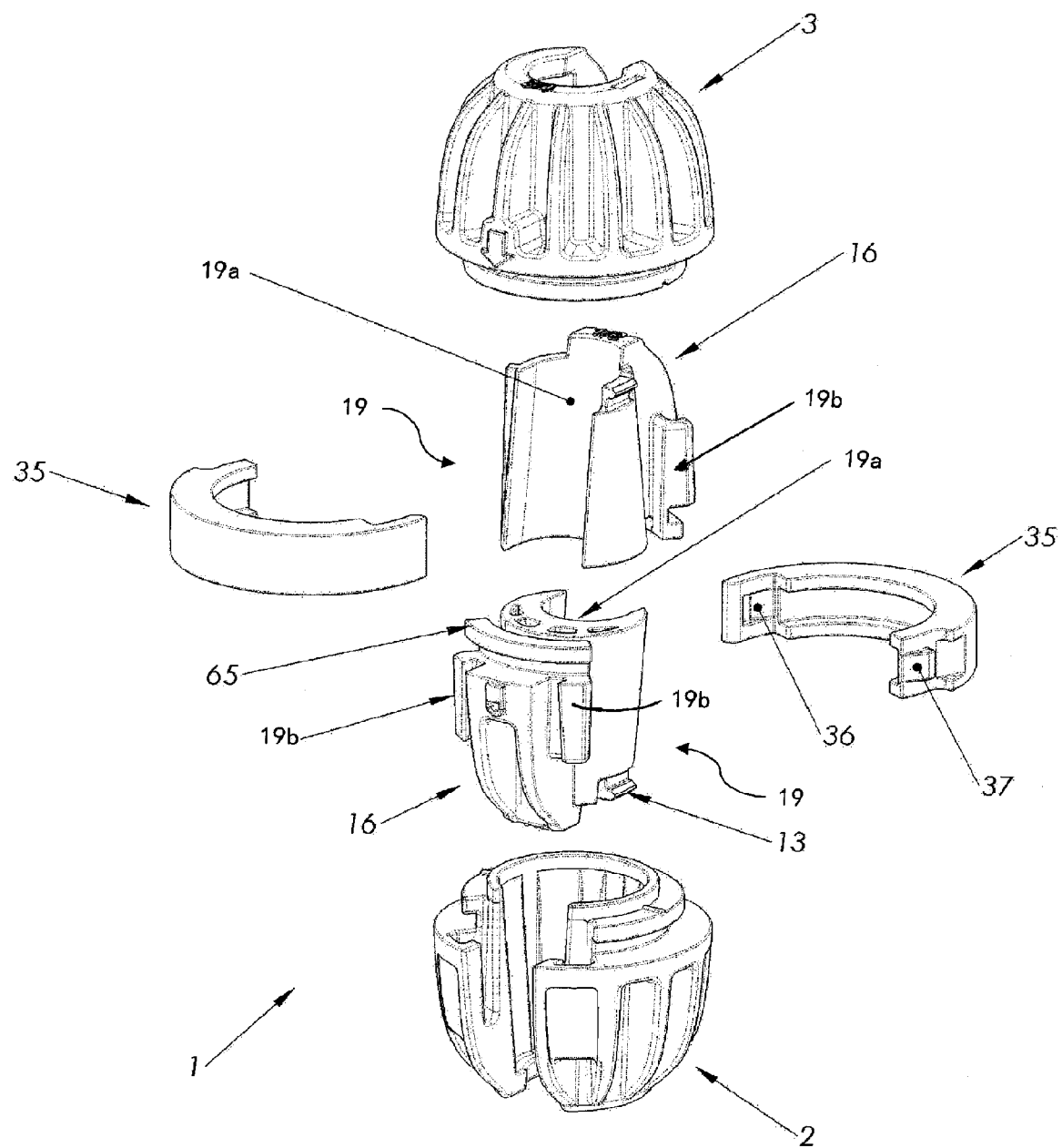
FIG. 2 displays the components of the device.
Figure 6:
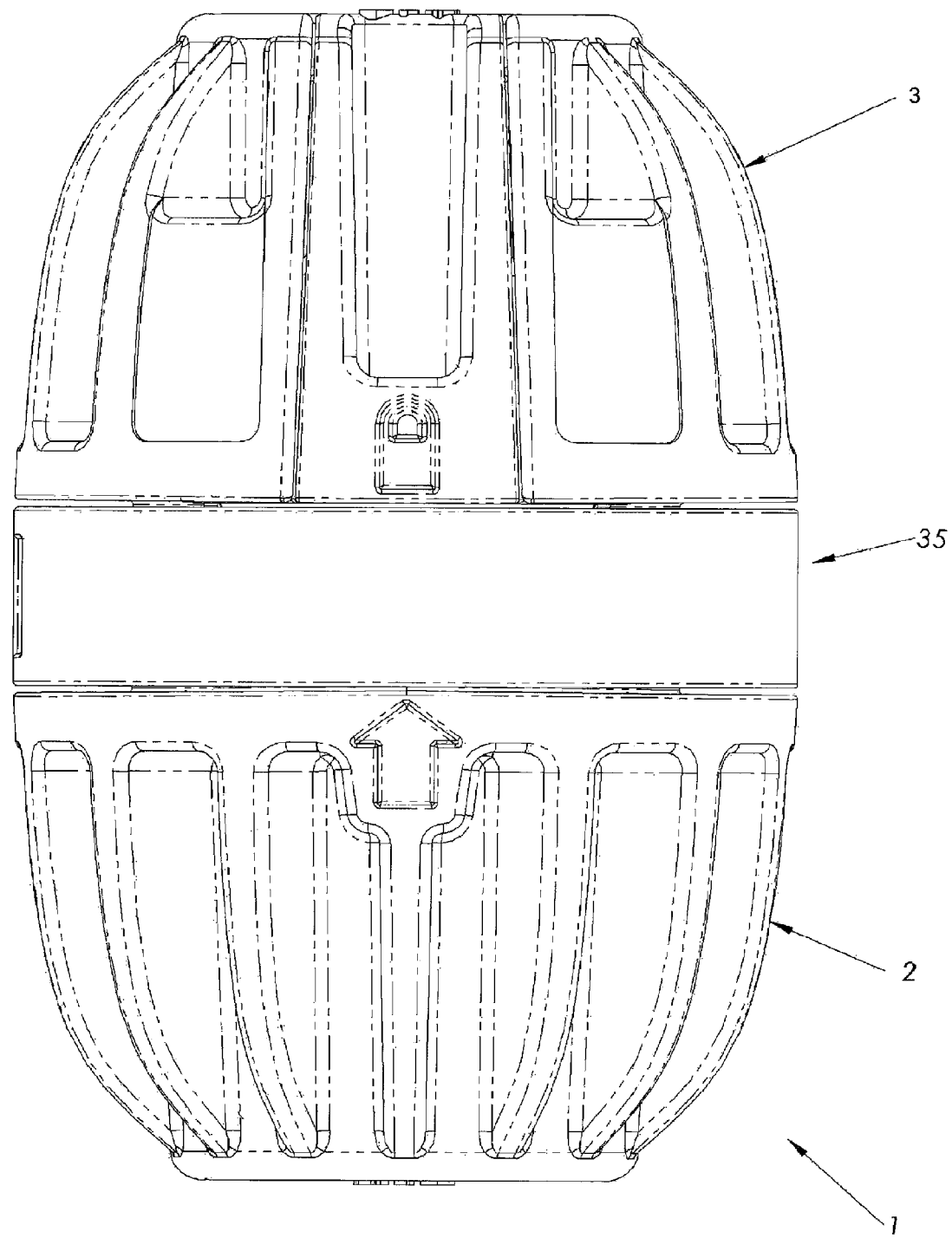
FIG. 6 displays a side view of the device.
Figure 7:
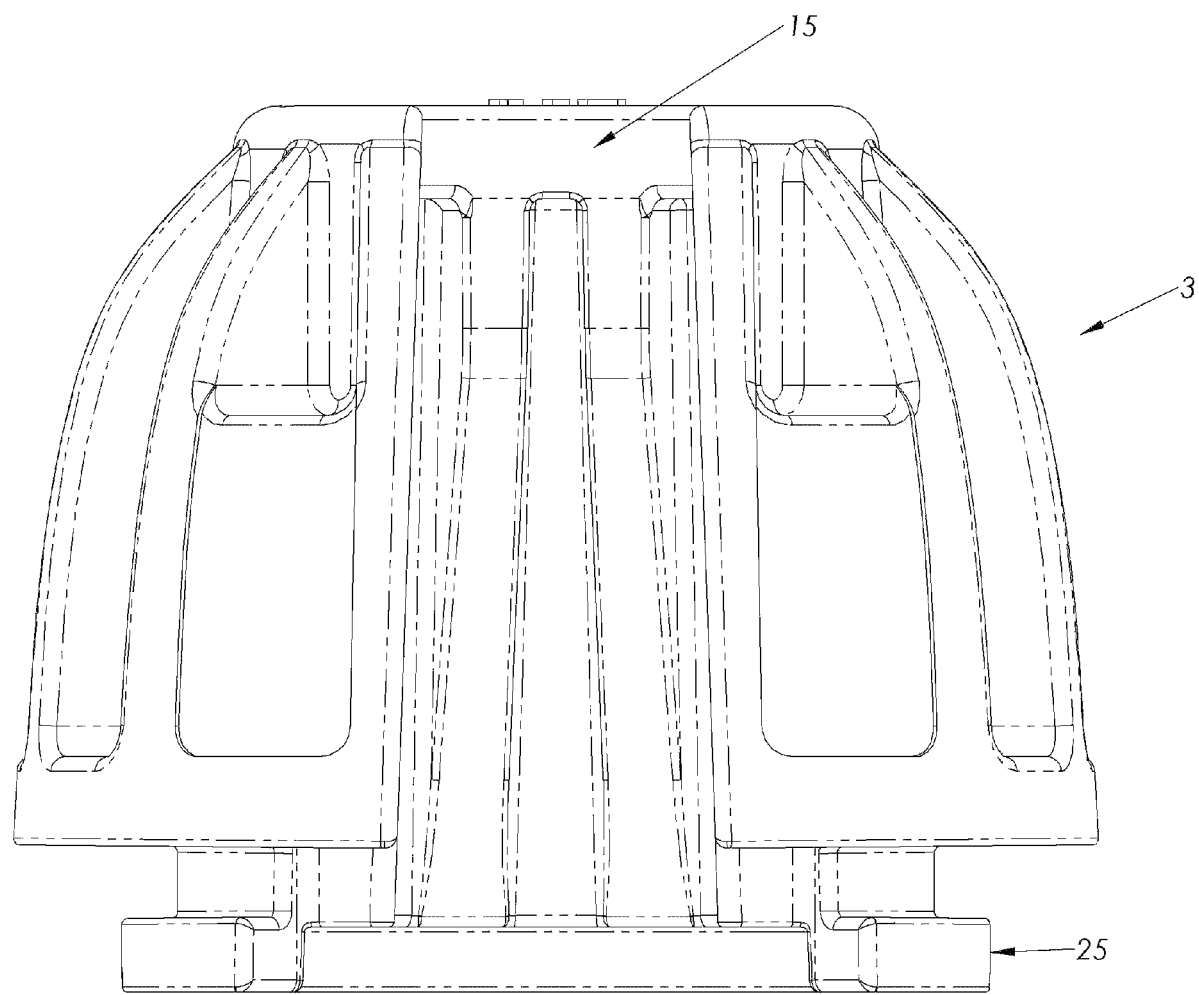
FIG. 7 displays an open side of the end cap.
Figure 8:
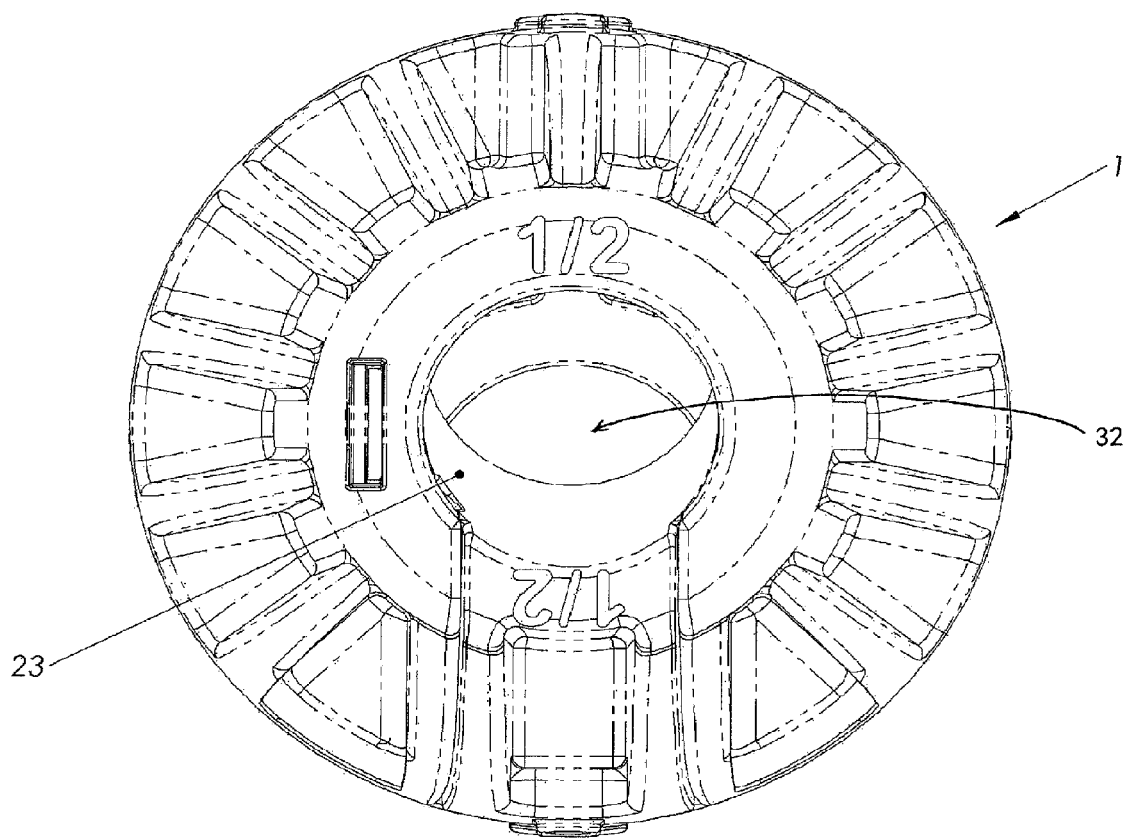
FIG. 8 displays a top view of the end cap.

As shown in FIG. 2, the invention consists of a male end cap 2 into which an insert 19 is placed and a female end cap 3 into which another insert 19 is placed with the two end caps being connected by a retaining collar 35. The inserts are interchangeable. There is no difference between the top insert 19 and the bottom insert 19. FIG. 6 is a side view of the two end caps, Female and Male 3, 2 connected by the retaining collar 35. In the preferred embodiment, there is a male end cap 2 and a female end cap 3.

Figure 4:
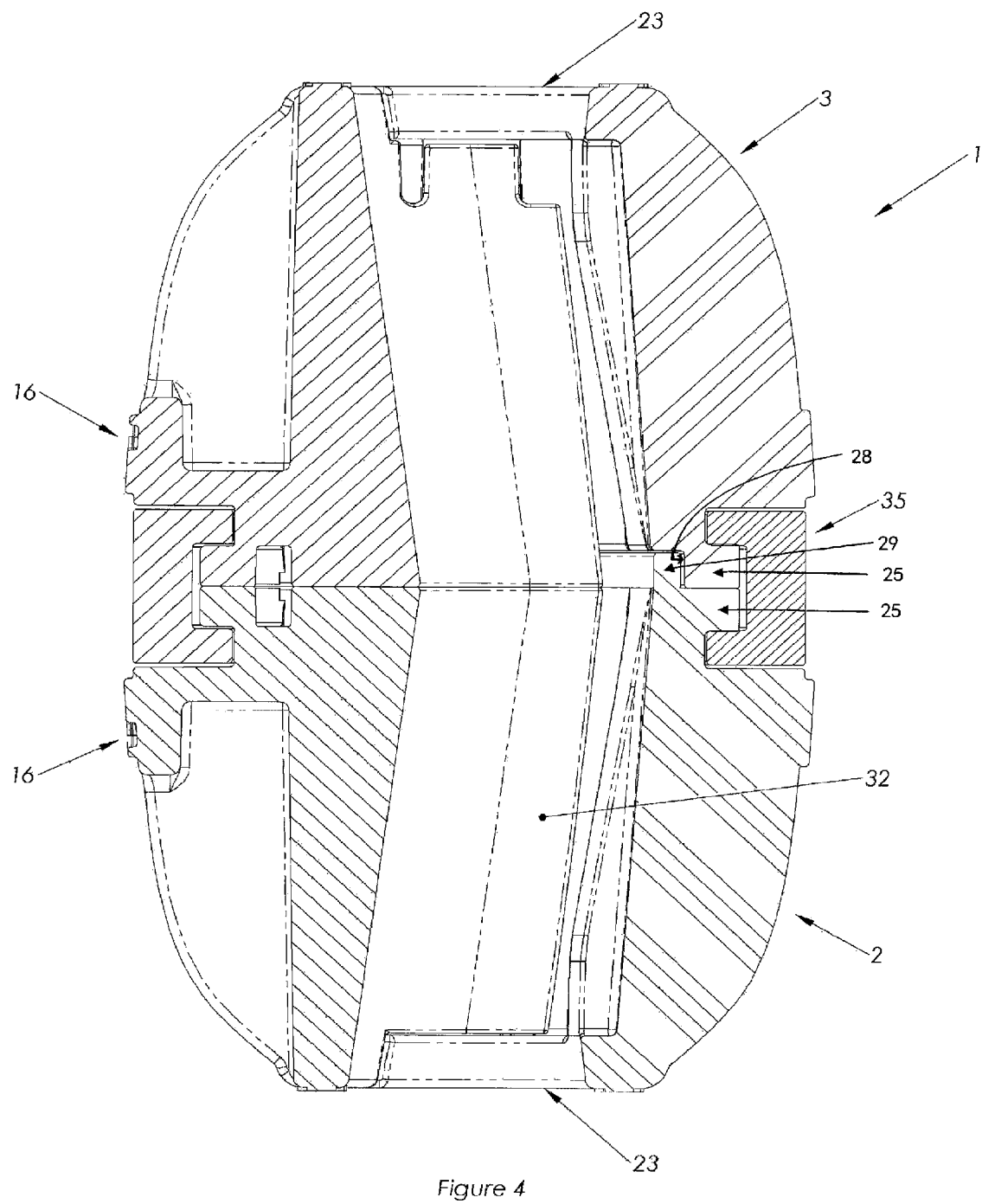
FIG. 4 displays a cross section of the device in an opened position.
Figure 5:
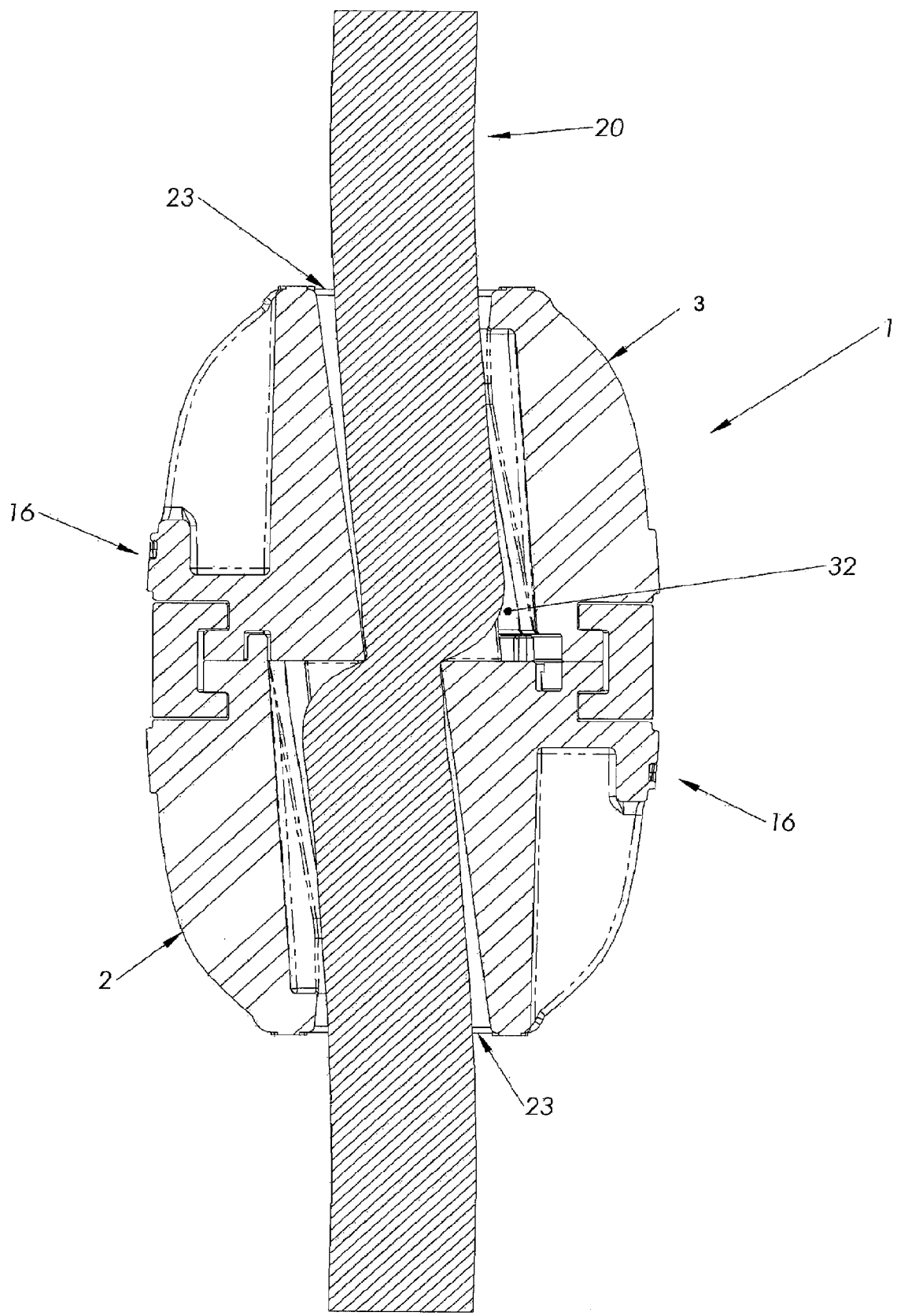
FIG. 5 displays a cross section of the device in a clamp position.

The female end cap 3 and the male end cap 2 are connected by the retaining collar 35. The connection allows the female end cap 3 and the male end cap 2 to be turned. To allow the device 1 to be moved along the rope 20 the circular opening of the combined inserts in the female end cap 3 aligns with the circular opening 23 of the combined insert in the male end cap 2 as shown in FIG. 4 which is a cross-section view of the device 1. When the device is at the location desired, the female end cap 3 and the male end cap 2 are turned in opposite directions along its axis. This reduces the effective cross-section of the opening between the inserts, thus pinching the rope 20 and holding the device 1 in place as shown in FIG. 5 which is a cross-cut view of the device 1 with the female end cap 3 and male end cap 2 turned to pinch the rope 20. There is friction within the device 1 to hold the rope and the device 1 uses a boss 201 and detent 203 on the mating faces of the end caps to provide a positive location and lock for the fully open and fully closed positions. Multiple detents could be used to allow for repeatable intermediate cross sectional lessening.

The Female end cap 3 is displayed in FIGS. 7, 8, 9a, 10 and 11. The Female end cap 3 is symmetric and is conical in shape. It will have an insert holding chamber 27. The Female end cap 3 will have an open insert slot 15 which opens to the insert holding chamber 27 so that the end cap 3 is in the c shape when viewed from the top or bottom. The open insert slot 15 is open completely forming an opening on one side. The female end cap 3 will have an end flange 25 at its bottom. Said flange having an internal counter bore 28 (FIG. 4) which will accept the corresponding hub 29 extending from the male end cap 3.

Figure 9A:
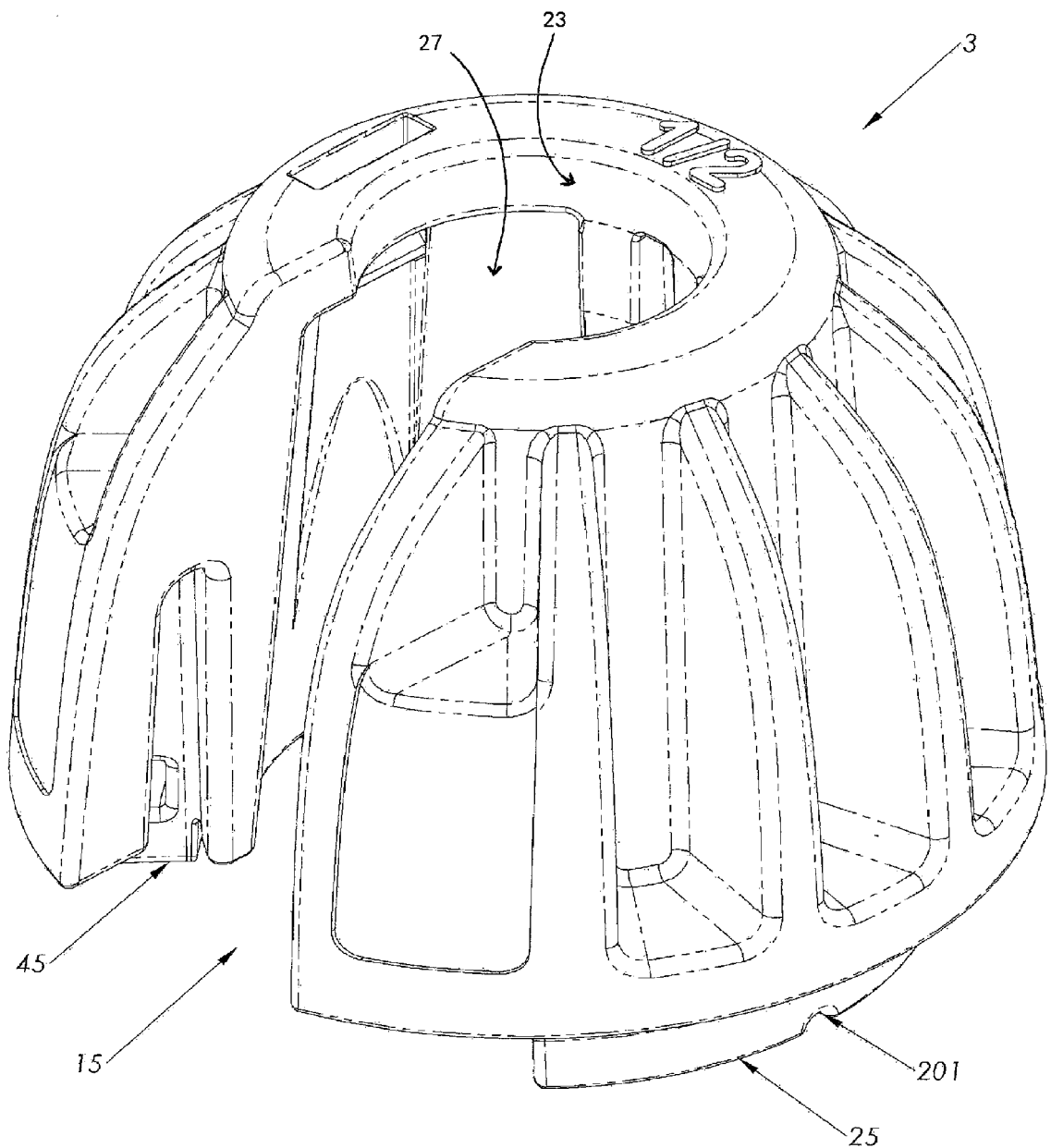
FIG. 9a displays a perspective view of the female end cap.
Figure 9B:
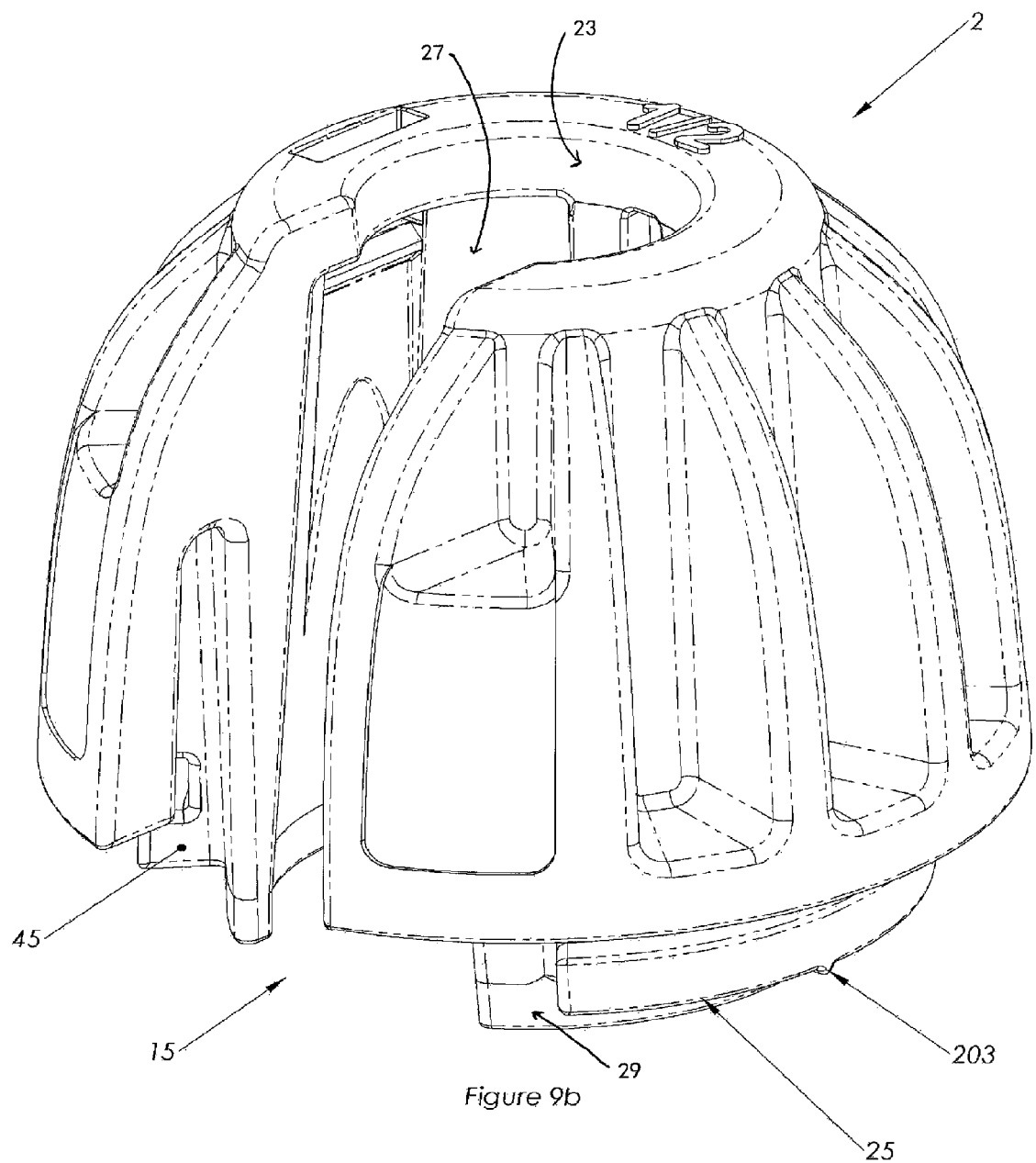
FIG. 9b displays a perspective view of the male end cap.
Figure 10:
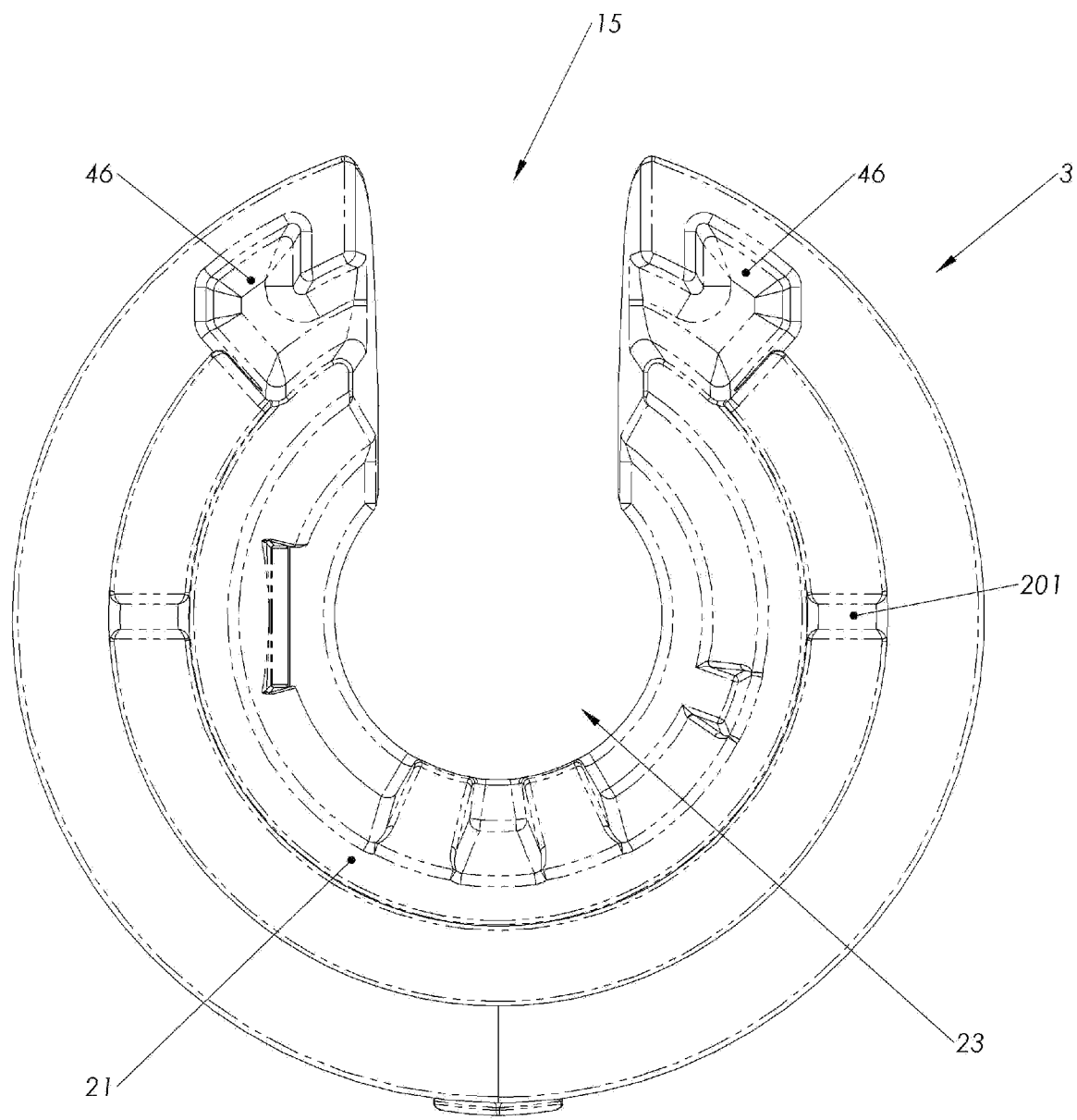
FIG. 10 displays a bottom view of the female end cap.
Figure 11:
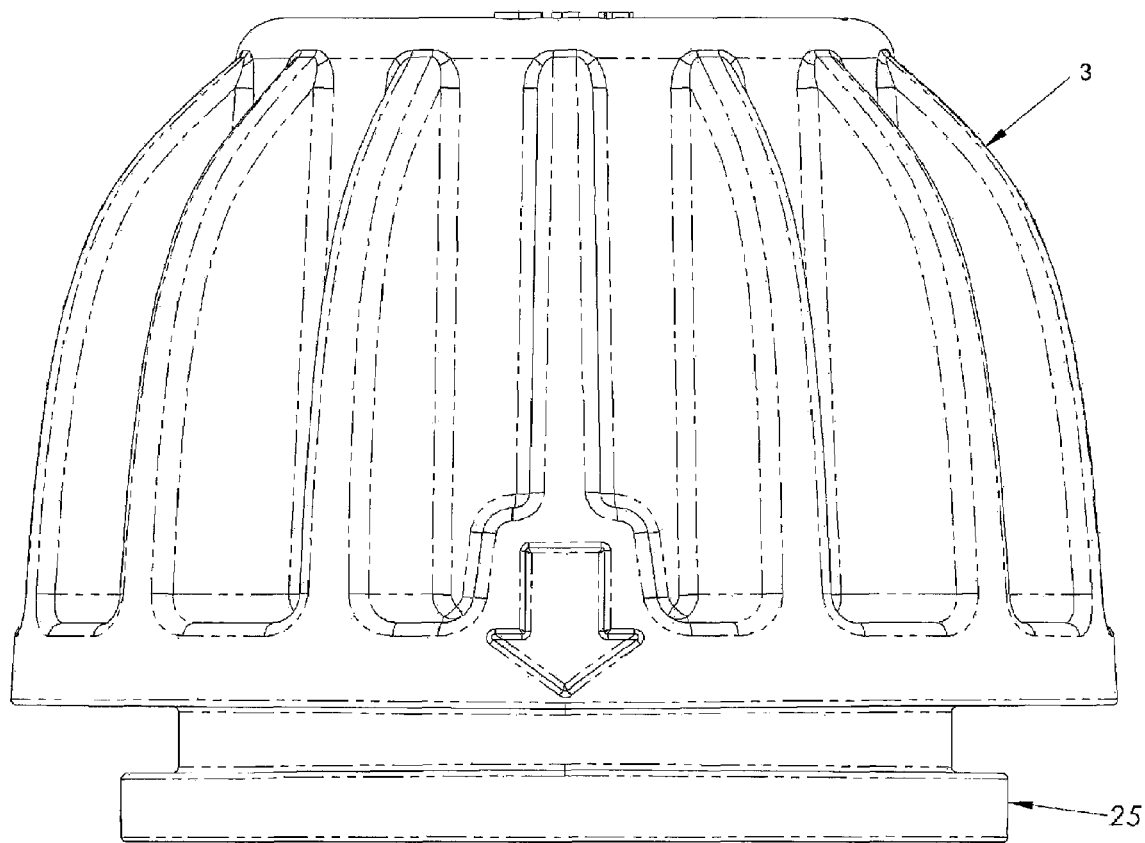
FIG. 11 displays a side view of the female end cap.

The Male end cap 2 is displayed in FIG. 9b. Like the Female end cap 3, the Male end cap 2 is symmetric and is conical in shape and will have an insert holding chamber 27. Like the Female end cap 3, the Male end cap 2 also will have an open insert slot 15 which opens to the insert holding chamber 27 so that the end cap 2 is in the c shape when viewed from the top or bottom. Like the Female end cap 3, the open insert slot 15 is open completely forming an opening on one side. The male end cap 2 will have an end flange 25 at its bottom. Said flange having a hub which mates with the corresponding counter bore of the female end cap.

This counter bore/hub connection maintains a central axis of rotation between the two end caps. This is critical to the operation of the assembled component. When the male end cap 2 and female end cap 3 are put together they mate and keep the two caps from slipping sideways when in the closed position. This is also shown in FIGS. 4 and 5.

The insert 19 will have outer extension 16 that will slide into the open insert slot 15. This will secure the inserts in the end caps and makes sure that the inserts are turned when the end cap is turned. The rope channel 32 is formed by the insert 19 and the end cap inner wall 21.

The inserts 19 have a semi-circle channel 19a on their interior side and when placed against the inner wall 21 of the end cap 2 it forms a circle opening through which a rope 20 is placed. The inside of the insert 19 is angled at about 45 degrees in an upward slope from top to bottom. It is this angle that allows the device 1 to pinch and hold on to the rope 20.

The outer extension 16 in the preferred embodiment will fit into the open insert slot 15. This will complete the circle. The insert 19 is slid into the end cap 2. The insert 19 will have insert fins 19b and each side of it that will fit into in insert fin slots 45 that run inside the open insert slot 15. In the preferred embodiment, the insert 19 will be held in place using an insert compression snap 13 that snaps into a compression snap depression 46 on the end cap 2. Other connection and securing means can be used. The insert 19 will have an insert flange 65 which will connect to the end flange 25. Once the insert 19 is inserted into the end cap 2, the end cap 2 and insert 19 will look like they are one piece.

To connect the rope 20 to the device 1, the rope is placed into the open insert slot 15. Next, the insert 19 is inserted into the end cap 2 and secured in place in forming the rope channel 32 and encircling the rope. This is done for the female end cap 3 and the male end cap 2 with the two end caps 2 and 3 being connected by the retaining collar 35. The retainer collar 35 clasps around the end flange 25 of the end caps holding the female end cap 3 and the male end cap 2 together.

Figure 12:
FIG. 12 displays a perspective view of the retaining collar half.
Figure 13:
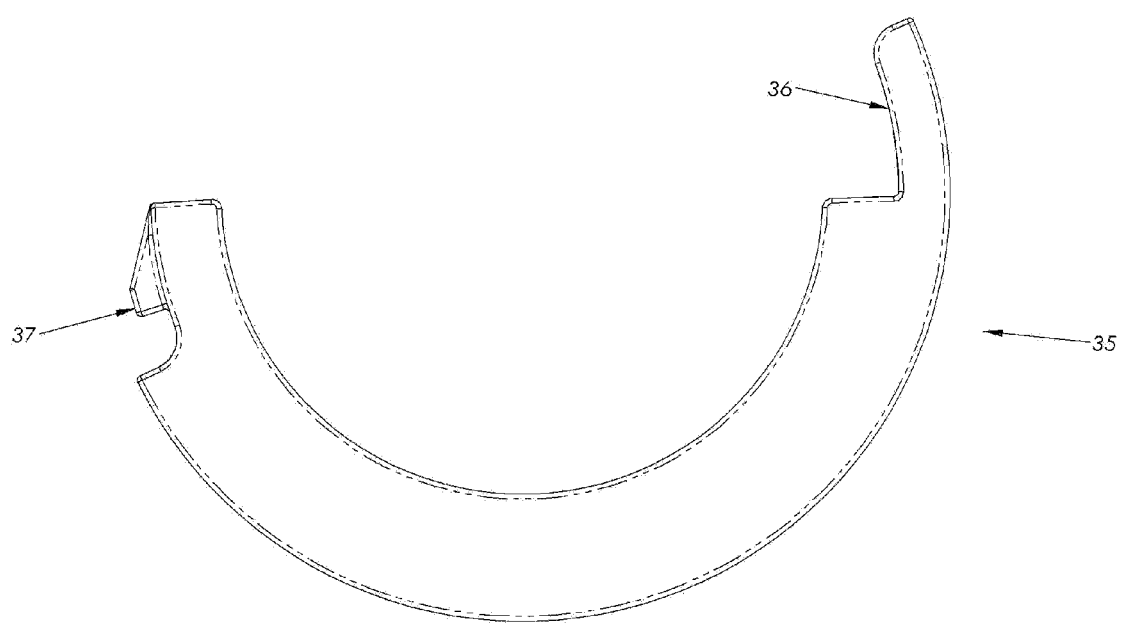
FIG. 13 displays a side view of the retaining collar half.

As shown in FIGS. 12 and 13, the retaining collar 35 is comprised of two retaining collar halves 35 which are symmetrical to each other. Each retaining collar half when attached to the other one to form the retaining collar 35 by an attachment means which in the preferred embodiment is a compression snap 37 that snaps into a compression snap depression 36 of the other retaining collar half. Other methods can include pins or screws are any other common connection. The retaining collar 35 is designed to span and contain the flanges of the female and male end caps so as to prevent any axial dislocation between the male and female end caps.

The male and female end caps are ergonomically designed with a ridge surface to allowing for gripping and turning of the male and female end caps. The male and female end caps can be turned either clockwise or counter-clockwise to secure the device 1 to the rope 20.

In the preferred embodiment, the device 1 is made of a durable plastic.

It is understood that there are many associated devices which will benefit from being able to be readily attached to and located along a length of rope. The mechanism by which these associated items employ the slip-knot as a locating device are covered under this invention As to a further discussion of the manner of usage and operation of the present invention, the same should be apparent from the above description. Accordingly, no further discussion relating to the manner of usage and operation will be provided.

With respect to the above description, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A device for gripping elongate articles, said device comprising:
   a male end cap;
   a first insert engaged with the male end cap;
   a first channel defined by said male end cap and said first insert, said first channel being disposed along a longitudinal axis of the device;
   a female end cap, and wherein a portion of the male end cap is receivable within a portion of the female end cap; and the male and female end caps are disposed in end-to-end relationship along the longitudinal axis;
   a second insert engaged with the female end cap; wherein each of the first and second inserts comprises:
      a body having a first end, a second end, an exterior wall, an inner wall, a first side and a second side; and wherein the inner wall of the body is semi-circular when viewed from either of the first and second ends;
   a second channel is defined by said female cap and said second insert;
   said second channel being disposed along the longitudinal axis; wherein said first and second channels comprise a rope channel adapted to receive the elongate articles therethrough;
   a longitudinally extending first slot is defined in the male end cap, and wherein the first insert is complementary to the first slot and is removably received therein;
   a longitudinally extending second slot is defined in the female end cap, and the second insert is complementary to the second slot and is removably received therein; and wherein each of the male and female end caps has:
      a first end, a second end, an exterior wall, an interior wall; a first side wall and a second side wall; and wherein the first and second side walls define the associated one of the first and second slots; and when the associated one of the first and second inserts is engaged with the male and female end caps, the first end of the body is aligned with the first end of the one of the male and female end caps, the second end of the body is aligned with the second end of the one of the male and female end caps, the exterior wall of the body is aligned with the exterior wall of the one of the male and female end caps, and the first and second sides of the body are in abutting contact with the first and second sides walls, respectively; and
   a plurality of ridges and recesses provided on the exterior walls of each of the male and female end caps and the first and second inserts; and
   a retaining collar connecting the male end cap to the female end cap.

2. The device as defined in claim 1, further comprising: a depression formed on one of the first and second sides of the body; and a snap formed on one of the first and second side walls of the associated one of the male and female end caps, where the snap is releasably engageable in the depression to retain the body in the associated one of the male and female end caps.

3. A device for gripping elongate articles, said device comprising:
   a first end cap;
   a first insert engaged with the first end cap;
   a first channel defined by said first end cap and said first insert, said first channel being disposed along a longitudinal axis of the device;
   a second end cap disposed in end-to-end relationship with the first end cap along the longitudinal axis;
   a second insert engaged with the second end cap;
   a second channel defined by said second end cap and said second insert; said second channel being disposed along the longitudinal axis; wherein said first and second channels comprise a rope channel adapted to receive the elongate articles therethrough; and wherein said first and second channels are longitudinally partially offset relative to each other when the first and second end caps are rotated to a position where they are adapted to secure the rope, wire or cable; and
   a retaining collar connecting the first end cap to the second end cap.

4. The device as in claim 3, wherein said first end cap and second end cap are rotatable relative to each other about the longitudinal axis and while they are connected together by the retaining collar, and are adapted to to secure a rope, wire or cable in the rope channel when so rotated.

5. The device as in claim 3, further comprising a first opening to the first channel in the first end cap and a second opening to the second channel in the second end cap; and wherein said-rope channel is adapted to have the rope, wire or cable threaded through-one of the first and second openings and out of the other of the first and second openings.

6. The device as defined in claim 3, wherein the first end cap is a male end cap and the second end cap is a female end cap, and a portion of the male end cap is receivable within a portion of the female end cap.

7. The device as in claim 6, further comprising:
   a slot defined in each of the male and female end caps; and
   a fin is provided on each of the first and second inserts; and wherein the fin is receivable in the slot to retain the one of the first and second inserts in the associated one of the male and female end caps.

8. The device as in claim 7, wherein said fins slide into said slots.

9. The device as in claim 6, wherein the male end cap includes a first flange disposed at one end thereof; and the female end cap includes a second flange disposed at one end thereof; and wherein said first and second flanges abut each other and said retaining collar engages the first and second flanges of said male and female end caps.

10. The device as in claim 3, wherein said retaining collar is comprised of two halves that are joined together through an attachment means.

11. The device as defined in claim 6, wherein the rope channel is circular in cross-section; and wherein rotating one of the male and female end caps in a first direction relative to the other reduces the cross-sectional size of the rope channel; and rotating the one of the male and female end caps in a second direction relative to the other, increases the cross-sectional size of the rope channel.

12. The device as defined in clam 10, further comprising:
a hub which extends longitudinally outwardly beyond the flange at the bottom of the first end cap; and
a counter bore is defined in the second end cap in a position complementary to the hub, and wherein the hub is received in the counter bore when the first and second end caps are placed in end-to-end relationship.

13. The device as defined in claim 10, further comprising:
a detent extending outwardly from the flange of one of the first and second end caps; and
a recess defined in the flange of the other of the first and second end caps, and wherein the detent is received in the recess when the first and second end caps are placed in end-to-end relationship.

14. The device as defined in claim 6, further comprising:
a longitudinally extending first slot is defined in the male end cap, and wherein the first insert is complementary to the first slot and is removably received therein; and
a longitudinally extending second slot is defined in the female end cap, and the second insert is complementary to the second slot and is removably received therein.

15. The device as defined in claim 14, wherein each of the first and second inserts comprises:
a body having a first end, a second end, an exterior wall, an inner wall, a first side and a second side; and wherein the inner wall of the body is semi-circular when viewed from either of the first and second ends.

16. The device as defined in claim 15, wherein the inner wall of the body is angled at about 45° from the first end to the second end thereof.

17. The device as defined in claim 15, wherein each of the male and female end cap has a first end, a second end, an exterior wall, an interior wall; a first side wall and a second side wall; and wherein the first and second side walls define the associated one of the first and second slots; and when the associated one of the first and second inserts is engaged with the male and female end caps the first end of the body is aligned with the first end of the one of the male and female end caps, the second end of the body is aligned with the second end of the one of the male and female end caps, the exterior wall of the body is aligned with the exterior wall of the one of the male and female end caps, and the first and second sides of the body are in abutting contact with the first and second sides walls, respectively.

18. The device as defined in claim 17, wherein each of the male and female end caps is substantially C-shaped when viewed from either of the first and second ends.

19. The device as defined in claim 17, wherein each of the male and female end caps is a truncated dome shape when viewed from the side.

* * * * *